(12) United States Patent
Beck et al.

(10) Patent No.: US 11,009,111 B2
(45) Date of Patent: May 18, 2021

(54) POWER SPLIT TRANSMISSION AND METHOD TO OPERATE A POWER SPLIT TRANSMISSION AND POWERTRAIN

(71) Applicant: ZF Friedrichshafen AG, Friedrichshafen (DE)

(72) Inventors: Stefan Beck, Eriskirch (DE); Raphael Himmelsbach, Friedrichshafen (DE); Philipp Rechenbach, Markdorf (DE); Michael Wechs, Weissensberg (DE); Johannes Kaltenbach, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/839,941

(22) Filed: Apr. 3, 2020

(65) Prior Publication Data
US 2020/0318718 A1 Oct. 8, 2020

(30) Foreign Application Priority Data

Apr. 5, 2019 (DE) ...................... 10 2019 204 891.9

(51) Int. Cl.
*F16H 47/04* (2006.01)
*B60K 6/365* (2007.10)
(Continued)

(52) U.S. Cl.
CPC ............. *F16H 47/04* (2013.01); *B60K 6/365* (2013.01); *B60K 2006/4825* (2013.01);
(Continued)

(58) Field of Classification Search
CPC ............. F16H 47/04; F16H 2037/0873; F16H 2037/0886; F16H 2037/103;
(Continued)

(56) References Cited

U.S. PATENT DOCUMENTS

| 4,976,666 A | 12/1990 | Meyerle |
| 6,440,026 B1 * | 8/2002 | Johnson .................. F16H 47/04 |
| | | 475/81 |

(Continued)

FOREIGN PATENT DOCUMENTS

| DE | 37 09 191 A1 | 5/1988 |
| DE | 39 09 940 A1 | 10/1989 |

(Continued)

OTHER PUBLICATIONS

German Search Report Corresponding to 10 2019 204 891.9 dated Dec. 20, 2019.

*Primary Examiner* — Justin Holmes
(74) *Attorney, Agent, or Firm* — Finch & Maloney, PLLC; Michael J. Bujold

(57) ABSTRACT

A power-split transmission (28) with a first power path and a second power path. In this case, the first power path is a mechanical power path and includes a primary planetary gearset (P1), a secondary planetary gearset (P2) and a tertiary planetary gearset (P3). Furthermore, the power-split transmission (28) is equipped with at least four shifting elements. In addition, a method for operating such a power-split transmission (28) is disclosed. Moreover, a drive-train (10) of a working machine with a power-split transmission (28) of the type concerned is presented.

15 Claims, 7 Drawing Sheets

(51) Int. Cl.
  *F16H 37/08*  (2006.01)
  *B60K 6/48*  (2007.10)
  *F16H 37/10*  (2006.01)

(52) U.S. Cl.
  CPC ............ *F05B 2260/40311* (2013.01); *F16H 2037/0873* (2013.01); *F16H 2037/0886* (2013.01); *F16H 2037/103* (2013.01); *F16H 2200/201* (2013.01); *F16H 2200/2012* (2013.01); *F16H 2200/2046* (2013.01)

(58) Field of Classification Search
  CPC ..... F16H 2200/2012; F16H 2200/2046; F16H 2200/201; B60K 6/365; B60K 2006/4825; B60K 6/44; F05B 2260/40311
  See application file for complete search history.

(56) References Cited

U.S. PATENT DOCUMENTS

| | | | |
|---|---|---|---|
| 6,485,387 B1 | 11/2002 | Goodnight et al. | |
| 8,425,359 B1 | 4/2013 | Holmes et al. | |
| 2016/0025189 A1* | 1/2016 | Kaltenbach | F16H 3/006 475/5 |
| 2016/0109001 A1* | 4/2016 | Schoolcraft | F16H 37/022 475/214 |
| 2018/0073612 A1* | 3/2018 | Beck | B60K 6/365 |

FOREIGN PATENT DOCUMENTS

| | | |
|---|---|---|
| DE | 197 57 329 A1 | 6/1999 |
| DE | 601 03 717 T2 | 10/2004 |
| DE | 10 2013 210 048 A1 | 12/2013 |
| DE | 10 2017 219 999 A1 | 5/2019 |

* cited by examiner

|  | S4 | S5 | S1 | S2 | S3 | S6 |
|---|---|---|---|---|---|---|
| FB-V1 | X |  | X |  |  |  |
| FB-V2 | X |  |  | X |  |  |
| FB-V3 |  |  |  | X | X |  |
| FB-V4 |  |  |  | X |  | X |
| FB-R1 |  | X | X |  |  |  |
| FB-R2 |  | X |  | X |  |  |

POWER SPLIT TRANSMISSION AND METHOD TO OPERATE A POWER SPLIT TRANSMISSION AND POWERTRAIN

This application claims priority from German patent application serial no. 10 2019 204 891.9 filed Apr. 5, 2019.

FIELD OF THE INVENTION

The invention relates to a power-split transmission with a first power path and a second power path, wherein the first power path is a mechanical power path, and to a method for operating a power-split transmission of that type.

Furthermore, the invention relates to a drive-train of a working machine, in particular a mobile working machine with a power-split transmission.

BACKGROUND OF THE INVENTION

Power-split transmissions are often used in the drive-trains of working machines and are basically known from the prior art. Examples of working machines are agricultural working machines such as tractors or working machines on building sites, such as wheel loaders.

In known power-split transmissions a number of operating ranges are usually available, which comprise different gear ratios. As a rule the operating ranges can be changed without traction force interruption. Particularly in applications in which the power-split transmission is used in a drive-train for traveling, both forward operating ranges and reversing operating ranges must be provided, which are also known as forward traveling and reverse traveling ranges. In known applications this is ensured by virtue of so-termed switchover units or turning units which are connected downstream from a main transmission in the form of a power-split transmission. A further, alternative term for a switchover unit is a reversing unit.

Starting from a power-split main transmission, the switchover or turning unit is arranged along a transmission axis of the main transmission close to the latter, which, starting from the main transmission, increases the axial fitting space occupied by this transmission group.

In general, however, in the field of transmission technology the effort is made to construct transmissions as compactly as possible, particularly where their axial length is concerned. This is important particularly in the case of electric-mechanical power-split transmissions, with which fitting space has to be provided for the electric machines.

SUMMARY OF THE INVENTION

It is therefore the purpose of the present invention to provide a power-split transmission with a particularly short axial length. Consequently the overall fitting space required for a drive-train comprising such a power-split transmission is reduced. It is understood that the axial compactness must not be achieved at the cost of the other functionalities of the transmission. One of the most important transmission functionalities is to provide operating ranges which, when the working machine is traveling, are also called traveling ranges.

This objective is achieved by a power-split transmission of the type mentioned to begin with, which comprises:
a input shaft,
an output shaft,
a primary planetary gearset with a first primary sun gear, a second primary sun gear, a shared primary planetary carrier and at least one shared primary planet gear,
a secondary planetary gearset with a secondary sun gear, a secondary planetary carrier and at least one secondary ring gear,
a tertiary planetary gearset with a first tertiary planetary gearset element,
a first shifting element,
a second shifting element,
a third shifting element, and
a fourth shifting element,
wherein the first primary sun gear is coupled to the input shaft in a rotationally fixed manner,
wherein the shared primary planetary carrier and the secondary sun gear can optionally be coupled in a rotationally fixed manner by means of the first shifting element,
wherein the second primary sun gear and the secondary sun gear can optionally be coupled in a rotationally fixed manner by means of the second shifting element,
wherein the primary planetary carrier and the secondary ring gear can optionally be coupled rotationally fixed by means of the third shifting element,
wherein the secondary ring gear can optionally be coupled rotationally fixed by means of the fourth shifting element to a transmission housing,
wherein the secondary planetary carrier is coupled rotationally fixed to the first tertiary planetary gearset element, and
wherein the output shaft is coupled rotationally fixed to the first tertiary planetary gearset element. In this connection a shifting element is understood to be a collective term for brakes and clutches, such that brakes always act relative to the transmission housing and clutches always couple two rotatable components. Thus, in the present case the first shifting element, the second shifting element and the third shifting element are in the form of clutches and the fourth shifting element is a brake. Such a power-split transmission is axially comparatively compact, since it uses planetary gearsets. These are particularly suitable for producing transmissions capable of transmitting large torques, yet they occupy little fitting space especially in the axial direction.

The design of the primary planetary carrier as a shared planetary carrier and the primary planetary gearwheel as a shared planetary gearwheel first of all results in the power-split transmission having comparatively few components. Accordingly it is simple to construct and light in weight. In addition this design is space-saving. Moreover, thanks to the smaller number of components its costs are reduced.

Preferably the power-split transmission is a continuously variable power-split transmission. The individual operating ranges or traveling ranges of the power-split transmission can therefore be changed without gear ratio jumps. In other words, the gear ratio provided by the power-split transmission can be adjusted continuously over the various operating or traveling ranges.

The shifting elements built into the power-split transmission can work frictionally or with interlock. The shifting elements made as clutches can in this connection be in the form of claw clutches or disk clutches. The shifting elements in the form of brakes can be disk brakes or claw connections.

In a preferred embodiment, the shared primary planetary gearwheel is a stepped gearwheel. Thus, it fulfills the function of two planetary gearwheels, these two planetary gearwheels having different diameters. Between the two planetary gearwheels realized by the shared planetary gearwheel, there is therefore no geometrical dependence. Consequently, with regard to its gear ratios and its structural size, the primary planetary gearset can be designed freely.

Since the primary planetary gearset comprises a shared planetary carrier and a shared primary planetary gearwheel, it can be made with only a single ring gear. Thus, the associated power-split transmission has comparatively fewer components. Accordingly it has a relatively simple structure, low weight, and occupies only little fitting space.

The aforesaid power-split transmission has a transmission axis that corresponds to a central axis of the planetary gearsets. Thus, during traction operation the power flow takes place along that transmission axis. Moreover, the input shaft and the output shaft preferably lie along the transmission axis.

According to an embodiment, a fifth shifting element and/or a sixth shifting element is/are provided. In that case the fourth and the fifth shifting element form a switchover unit integrated in the power-split transmission. This provides a forward gear or forward traveling range and a reversing gear or reverse traveling range. Accordingly, there is no need for a switchover unit in the form of a range transmission, so that less axial space is occupied. Furthermore, by virtue of the total of six shifting elements four forward traveling ranges and two reverse traveling ranges are produced, as will be explained later. With regard to this functional scope, the power-split transmission comprises comparatively few components, and its structure is compact.

The tertiary planetary gearset can be a minus planetary gearset and the first tertiary planetary gearset element can be a tertiary planetary carrier, while a second tertiary planetary gearset element can be a tertiary ring gear. A planetary gearset is a minus planetary gearset if the two coaxial central gears, i.e. the ring gear and the sun gear, rotate in opposite directions when the planetary carrier is stationary. In that case a stationary gear ratio of the transmission concerned is negative.

In this connection the second tertiary planetary gearset element in the form of the tertiary ring gear can be optionally coupled rotationally fixed to the transmission housing by means of the fifth shifting element, and the secondary ring gear can be coupled rotationally fixed to a tertiary sun gear. Alternatively, a tertiary ring gear can be coupled rotationally fixed to the transmission housing and the secondary ring gear can optionally be coupled rotationally fixed to a tertiary sun gear by means of the fifth shifting element. From the standpoint of the torque flow from the input shaft to the output shaft of the power-split transmission such couplings are advantageous. In particular, in this way the torque is passed on to the output shaft comparatively directly, i.e. without backflow. Such a structure of the power-split transmission results in a compact design of the same.

Alternatively, the tertiary planetary gearset can be a plus planetary gearset and the first tertiary planetary gearset element can be a tertiary ring gear while the second tertiary planetary gearset element can be a tertiary planetary carrier. A planetary gearset is a plus planetary gearset if the two coaxial central gears, i.e. the ring gear and the sun gear, rotate in the same direction when the planetary carrier is stationary. The stationary gear ratio of a corresponding transmission is then positive. A plus planetary gearset always comprises two planetary groups and therefore has at least one inner planetary gearwheel and an outer planetary gearwheel, which are coupled to a common planetary carrier.

In a variant, the second tertiary planetary gearset element is a tertiary planetary carrier which can optionally be coupled rotationally fixed to the transmission housing by means of the fifth shifting element, and the secondary ring gear is coupled rotationally fixed to a tertiary sun gear. From the standpoint of the torque flow from the input shaft to the output shaft of the power-split transmission such couplings are advantageous. In particular, in this way the torque is passed on to the output shaft comparatively directly, i.e. without backflow. Such a structure of the power-split transmission results in a compact design of the same.

In an alternative design it can be provided that:
the secondary sun gear can optionally be coupled rotationally fixed to the secondary planetary carrier by means of the sixth shifting element, or
the secondary sun gear can optionally be coupled rotationally fixed to the secondary ring gear by means of the sixth shifting element, or
the secondary planetary carrier can optionally be coupled rotationally fixed to the secondary ring gear by means of the sixth shifting element. In this way the secondary planetary gearset can be blocked. Thus a further forward gear or forward traveling range is obtained, since the secondary planetary gearset has no transmission function in the blocked condition. A traveling range obtained in this way is very efficient with regard to the associated occupation of structural space.

Preferably, the first shifting element and the second shifting element are arranged in a radially nested manner, in particular in such manner that the second shifting element is radially inside the first shifting element. The shifting elements can therefore be in the form of a so-termed double shifting element. In that way less structural space is occupied, particularly in the axial direction. In the case when the first and second shifting elements are in the form of disk clutches, in that arrangement they can use a shared disk carrier, which simplifies the structure of the transmission and further reduces the space required.

The third shifting element and the sixth shifting element can also be arranged radially nested, in particular in such manner that the sixth shifting element is radially inside the third shifting element. This has the effects and advantages as explained in relation to the first and second shifting elements.

Furthermore, it is possible for the fourth and fifth shifting elements to be radially nested, in particular in such manner that the fifth shifting element is radially inside the fourth shifting element. In that case the tertiary planetary gearset is in the form of a minus planetary gearset. Again, this has the effects and advantages as explained in relation to the first and second shifting elements.

According to a variant the fourth shifting element and/or the fifth shifting element is/are positioned radially outside the secondary planetary gearset and/or the tertiary planetary gearset. In other words, the shifting elements and the planetary gearsets are radially nested. In this way too existing structural space is used efficiently. Moreover, the shifting elements are then easily accessible, for example for maintenance work.

A first adjustment unit of the second power path can be rotationally coupled to the input shaft, in particular rotationally coupled by means of a transmission stage, and a second adjustment unit of the second power path, which is coupled by way of the second power path to the first adjustment unit, can be coupled rotationally fixed to a primary ring gear, in particular rotationally coupled by means of a transmission stage. The transmission stages can be in the form of spur gear stages or planetary gearwheel stages. In that way the power-split transmission can be simply integrated into an associated drive-train, whereby in particular desired gear ratios and rotational directions can be obtained.

Preferably the second power path is an electrical power path and the first adjustment unit comprises a first electric machine and the second adjustment unit comprises a second electric machine, or the second power path is a hydraulic power path and the first adjustment unit comprises a first hydrostat and the second adjustment unit comprises a second hydrostat. The power-split transmission is then either an electrical-mechanical power-split transmission or a hydraulic-mechanical power-split transmission. Both types of transmission have proved their worth in the sector of working machines. In particular these types of transmissions are well suited for the environmental conditions prevailing in the sector of working machines, which leads to a high reliability of such power-split transmissions.

In addition the objective is achieved by a method for operating a power-split transmission according to the invention, in which method:
- a first forward traveling range is set, by closing the first shifting element and the fourth shifting element and opening all the other shifting elements,
- a second forward traveling range is set by closing the second and the fourth shifting elements and opening all the other shifting elements,
- a third forward traveling range is set by closing the third and second shifting elements and opening all the other shifting elements,
- a fourth forward traveling range is set by closing the second shifting element and a sixth shifting element and opening all the other shifting elements,
- a first reverse traveling range is set by closing the first shifting element and a fifth shifting element and opening all the other shifting elements, and/or
- a second reverse traveling range is set by closing the second and fifth shifting elements and opening all the other shifting elements. Thus, four forward travailing ranges and two reverse traveling ranges can be obtained. Having regard to this functional scope the power-split transmission is compactly built, particularly in its axial direction.

In the present context the operating ranges of transmissions are always referred to as traveling ranges. However, this does not imply that only such transmissions are meant which relate to traveling operation. Rather, transmissions are also explicitly meant which do not do that. Thus, all the traveling ranges are to be understood in the broadest sense as operating ranges.

The objective is further achieved by a drive-train of a working machine of the type mentioned at the start, which comprises a power-split transmission according to the invention, such that the drive-train is associated in particular with a mobile working machine. Thanks to the already explained compactness of the power-split transmission a drive-train is obtained, in which there is enough room in particular for the electric machines present in electrical-mechanical power-split transmissions and that have to be integrated in the drive-train.

BRIEF DESCRIPTION OF THE DRAWINGS

Below, the invention will be explained with reference to various example embodiments illustrated in the attached drawings, which show.

DETAILED DESCRIPTION OF THE PREFERRED EMBODIMENTS

Figure 1:
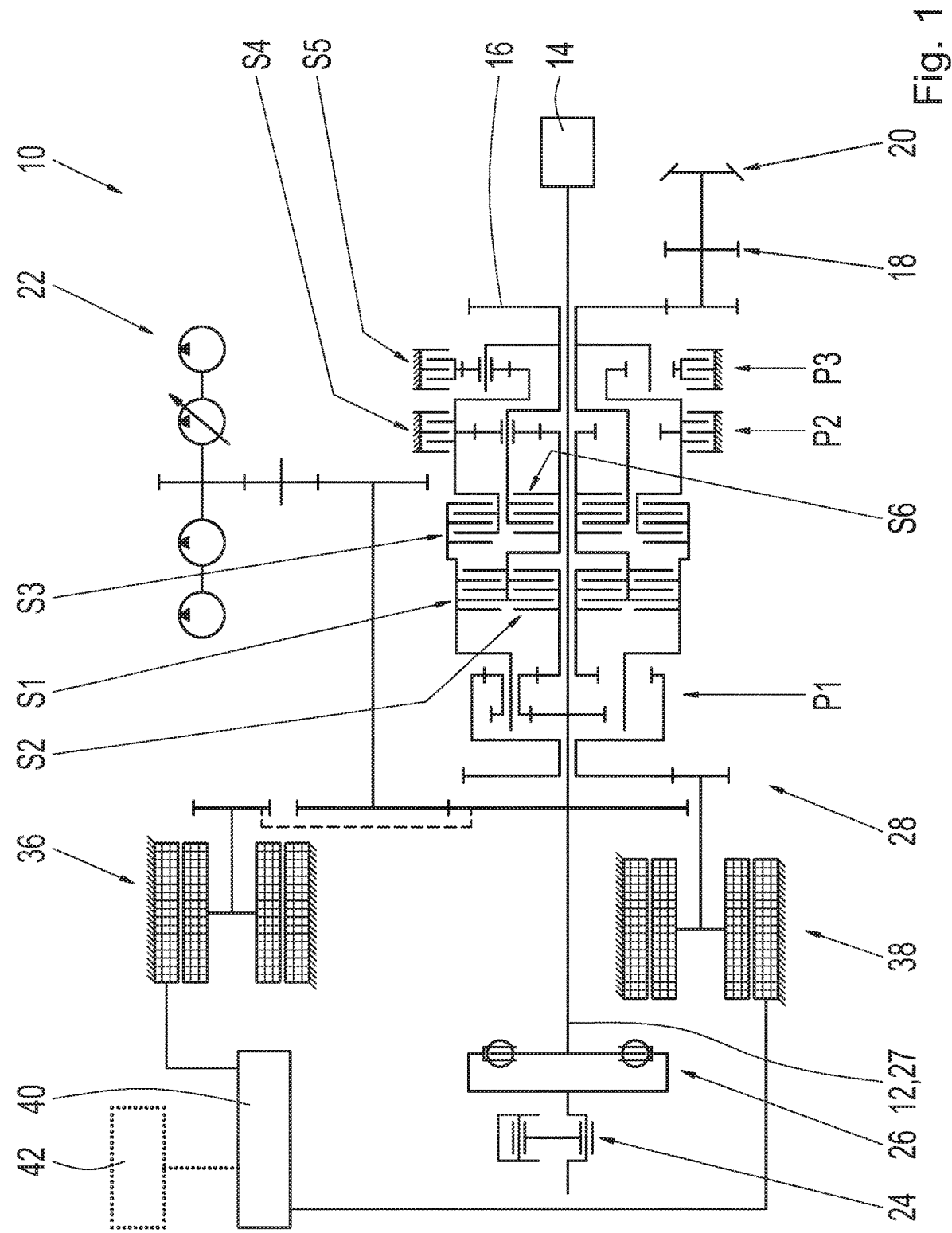
FIG. 1: A drive-train according to the invention with a power-split transmission according to the invention, which can be operated by means of a method according to the invention.

FIG. 1 shows a drive-train 10 for a mobile working machine.

This serves on the one hand to drive a power take-off, for which a power take-off gear system 14 is provided. On the other hand, the drive-train 10 serves as the traveling drive for the mobile working machine. For that purpose an output shaft 16 is provided.

By way of the output shaft 16, a front-wheel drive output 18 and a rear-wheel drive output 20 can be supplied with power in the form of rotational speed and torque.

Furthermore, the drive-train 10 is used for driving other aggregates and pumps, which are indicated only schematically in FIG. 1 and are indexed 22.

The source of energy for the drive-train 10 is a drive motor 24, which in the present case is indicated schematically as a combustion engine. By way of a vibration damper 26 this drives an input shaft 12.

In the embodiments shown, both the input shaft 12 and the output shaft 16 are arranged on a transmission axis 27.

In this case a continuously variable, mechanical-electrical power-split transmission 28 is connected between the input shaft 12 and the output shaft 16.

The mechanical arm or mechanical power branch of this power-split transmission 28 comprises a primary planetary gearset P1, a secondary planetary gearset P2 and a tertiary planetary gearset P3, which will be described in detail later.

The electrical arm or electrical power branch of the power-split transmission 28 contains a first adjustment unit 36 and a second adjustment unit 38, each in the form of an electric machine and electrically coupled with one another.

The two adjustment units 36, 38 are in addition coupled, via a control unit 40, to an electrical storage unit 42. Besides the drive motor 24, this storage unit 42 can serve as an energy source for the drive-train 10. Such drive-trains can be called hybrid drive-trains.

In the embodiment shown in FIG. 1, the first adjustment unit 36 is coupled in a rotationally fixed manner to the input shaft 12 by means of a transmission stage (not described further), which is represented as a spur gear stage.

The second adjustment unit 38 is coupled rotationally fixed to the first planetary gearset P1 by means of a transmission stage (not described further) represented as a spur gear stage.

Figure 2:
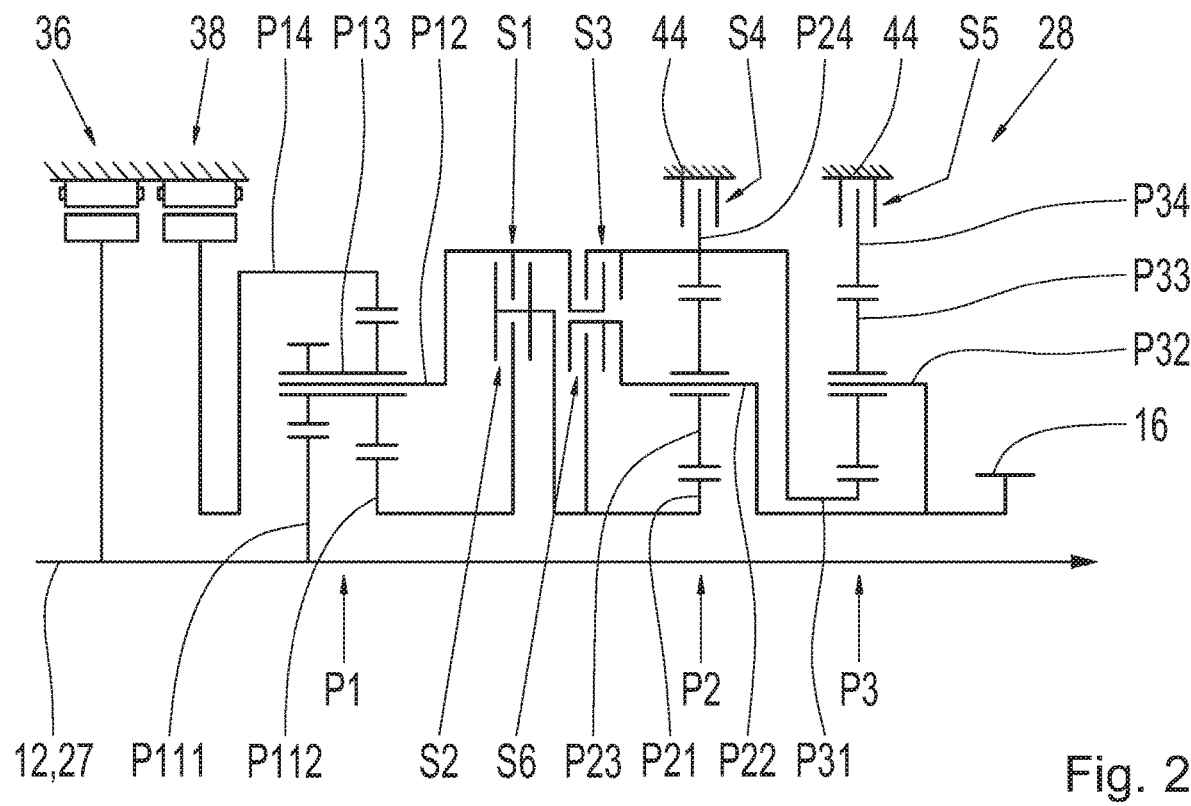
FIG. 2: Detailed view of the power-split transmission in FIG. 1, FIG. 3: An alternative embodiment of the power-split transmission in FIG. 2, FIG. 4: A drive-train alternative to that of FIG. 1, with a power-split transmission according to the invention as shown in FIG. 3, FIG. 5: A further embodiment of the power-split transmission according to the invention, alternative to those shown in FIGS. 2 and 3, FIG. 6: A shifting scheme pertaining to the power-split transmissions in FIGS. 1 to 5, FIG. 7: An additional embodiment of a power-split transmission according to the invention.

The power-split transmission 28 is shown in detail in FIG. 2.

As already mentioned, it comprises a primary planetary gearset P1. This has a first primary sun gear P111, a second primary sun gear P112, a shared primary planetary carrier P12 and at least one shared primary planetary gearwheel P13. In addition the primary planetary gearset P1 has a primary ring gear P14.

Here, the shared primary planetary gearwheel P13 is in the form of a stepped planetary gearwheel.

Furthermore, the primary ring gear P14 is the only ring gear of the primary planetary gearset P1.

The primary ring gear P14 is, for example, associated with the second primary sun gear P112. In other words the first primary sun gear P111 is, so to speak, free from a ring gear since no ring gear is (directly) associated with the first primary sun gear P111, as is clear from FIG. 2.

The secondary planetary gearset P2 of the power-split transmission 28 comprises a secondary sun gear P21, a secondary planetary carrier P22, a secondary planetary gearwheel P23 and at least one secondary ring gear P24.

Further, the power-split transmission 28 comprises the tertiary planetary gearset P3, which in the embodiment according to FIGS. 1 and 2 is a minus planetary gearset.

Thus, the tertiary planetary gearset P3 comprises a tertiary sun gear P31, a first tertiary planetary gearset element P32 in the form of a tertiary planetary carrier, a tertiary planetary gearwheel P33 and a second tertiary planetary gearset element P34 in the form of a tertiary ring gear.

These elements are coupled as follows:

The first adjustment unit 36 is coupled rotationally fixed to the input shaft 12.

The first primary sun gear P111 is also coupled rotationally fixed to the input shaft 12.

The second adjustment unit 38 is coupled rotationally fixed to the primary ring gear 14.

So far as the secondary planetary gearset P2 and the tertiary planetary gearset P3 are concerned, the secondary planetary carrier P22 is coupled rotationally fixed to the first tertiary planetary gearset element P32, which in the variant shown is a tertiary planetary carrier.

Moreover, the output shaft 16 is coupled rotationally fixed to the first tertiary planetary gearset element P32, i.e. to the tertiary planetary carrier.

In addition the secondary ring gear P24 is coupled rotationally fixed to the tertiary sun gear P31.

Furthermore, six shifting elements S1, S2, S3, S4, S5 and S6 are provided.

In this case the shared primary planetary carrier P12 and the secondary sun gear P21 can optionally be coupled to one another in a rotationally fixed manner by means of a first shifting element S1.

The second primary sun gear P112 and the secondary sun gear P21 can optionally be coupled rotationally fixed by means of a second shifting element S2.

The shared primary planetary carrier P12 and the secondary ring gear P24 can optionally be coupled rotationally fixed by means of a third shifting element S3.

The secondary ring gear P24 can optionally be coupled rotationally fixed to a transmission housing 44 by means of a fourth shifting element S4.

The second tertiary planetary gearset element P34, which is in the form of a tertiary ring gear, can moreover be optionally coupled rotationally fixed to the transmission housing 44 by means of a fifth shifting element S5.

The secondary sun gear P21 can optionally be coupled rotationally fixed to the secondary planetary carrier P22 by means of a sixth shifting element S6.

In the variant according to FIGS. 1 and 2, the first shifting element S1 and the second shifting element S2 are arranged radially nested one inside the other, with the second shifting element S2 radially inside the first shifting element S1.

If the first shifting element S1 and the second shifting element S2 are disk clutches, a shared disk carrier can be used.

The third shifting element S3 and the sixth shifting element S6 are also arranged radially nested, with the sixth shifting element S6 radially inside the third shifting element S3. In the embodiment according to FIGS. 1 and 2, however, the third shifting element S3 and the sixth shifting element S6 use disk carriers separate from one another provided that the shifting elements S3, S6 are anyhow in the form of disk clutches.

The fourth shifting element S4 and the fifth shifting element S5 are arranged radially outside the secondary planetary gearset P2 and the tertiary planetary gearset P3.

Figure 3:
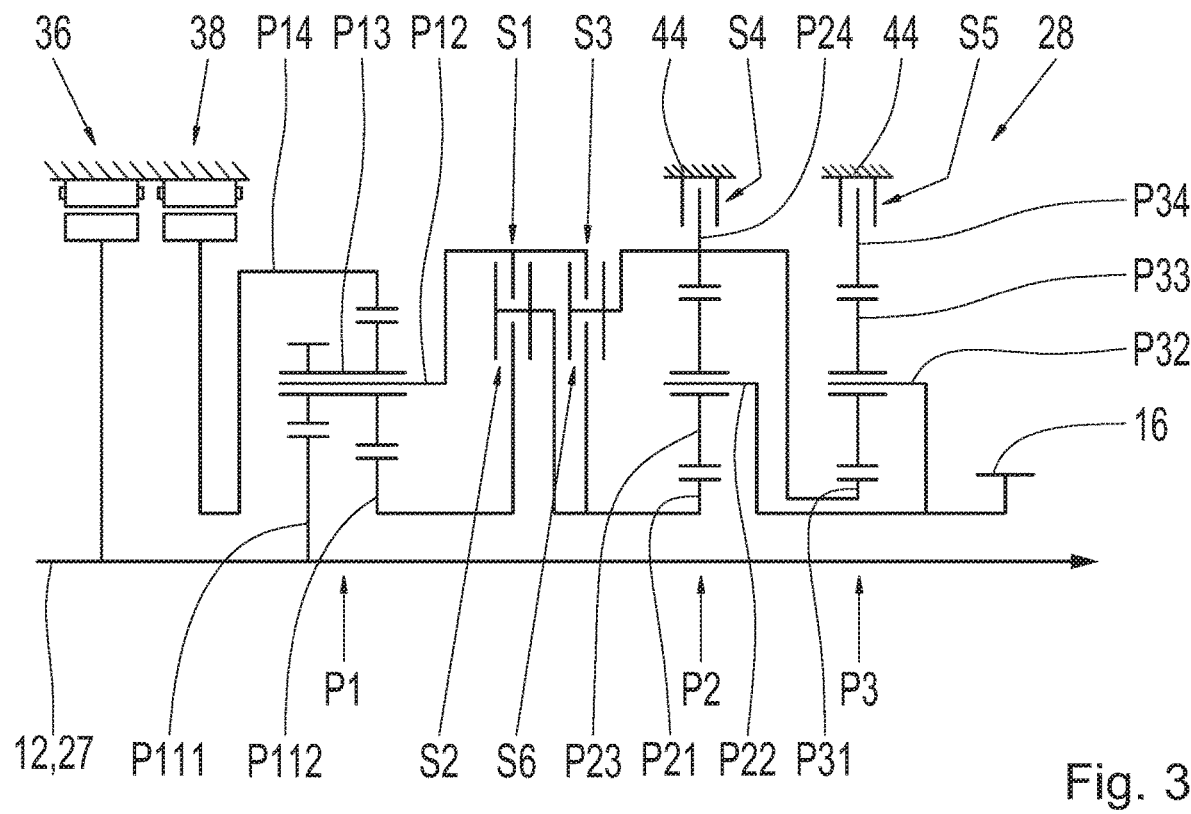

FIG. 3 shows an alternative embodiment of the power-split transmission 28, which differs from the embodiment according to FIG. 2 only in that the sixth shifting element S6 now optionally couples the secondary sun gear P21 to the secondary ring gear P24 in a rotationally fixed manner. In other respects reference can be made to the explanations regarding FIG. 2.

Furthermore, if the third shifting element S3 and the sixth shifting element S6 are disk clutches they can now use a shared disk carrier.

Since in the variant according to FIG. 3, when the secondary planetary gearset is blocked the sixth shifting element S6 only has to maintain a comparatively small blocking torque, it can be made comparatively compact.

Thus, if the sixth shifting element S6 is a disk clutch, it can have comparatively few disks.

Figure 4:
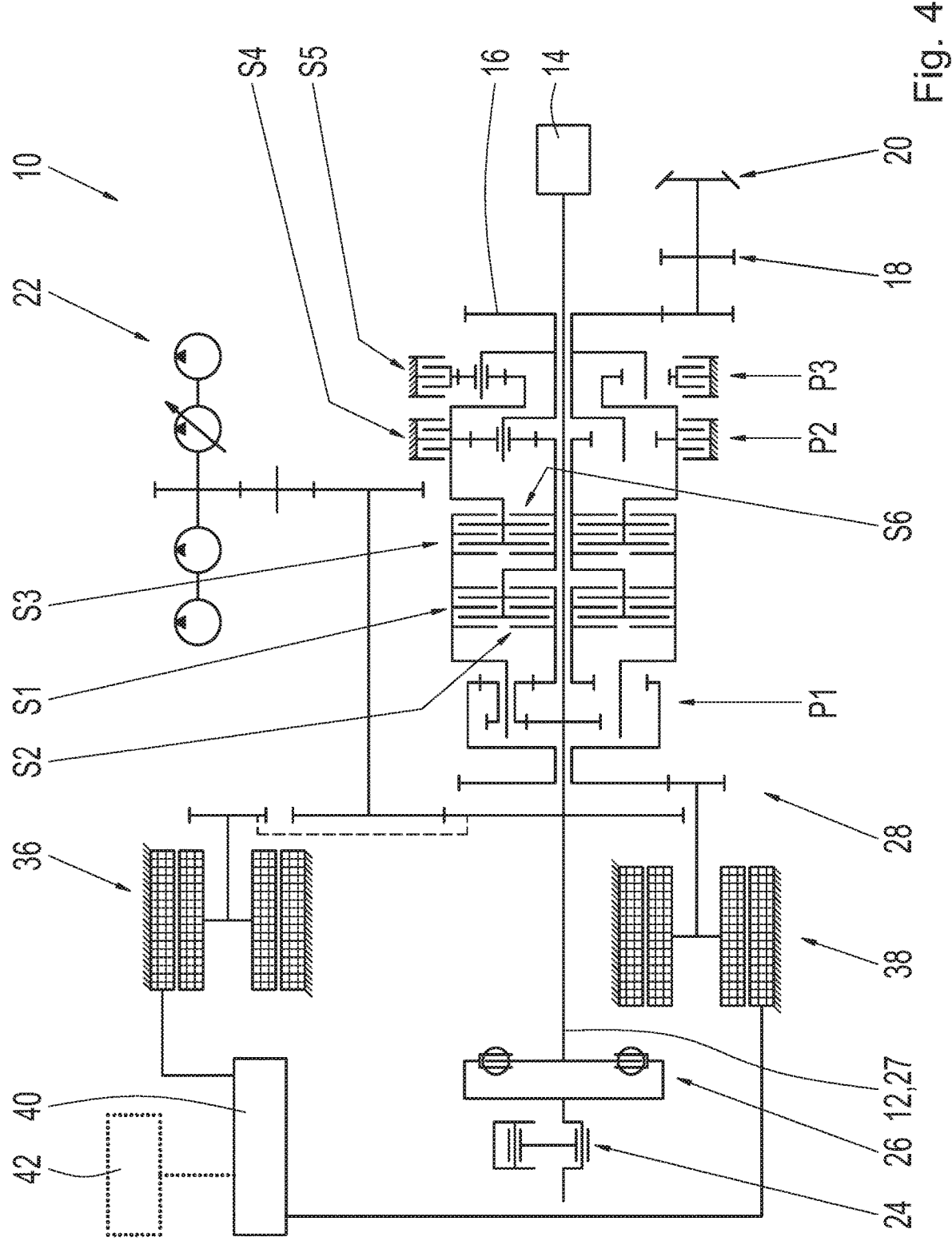

FIG. 4 shows the power-split transmission 28 in the overall context of the drive-train 10. Except for the power-split transmission this corresponds to the drive-train in FIG. 1, so reference can be made to the descriptions concerning the latter.

Figures 5, 6:
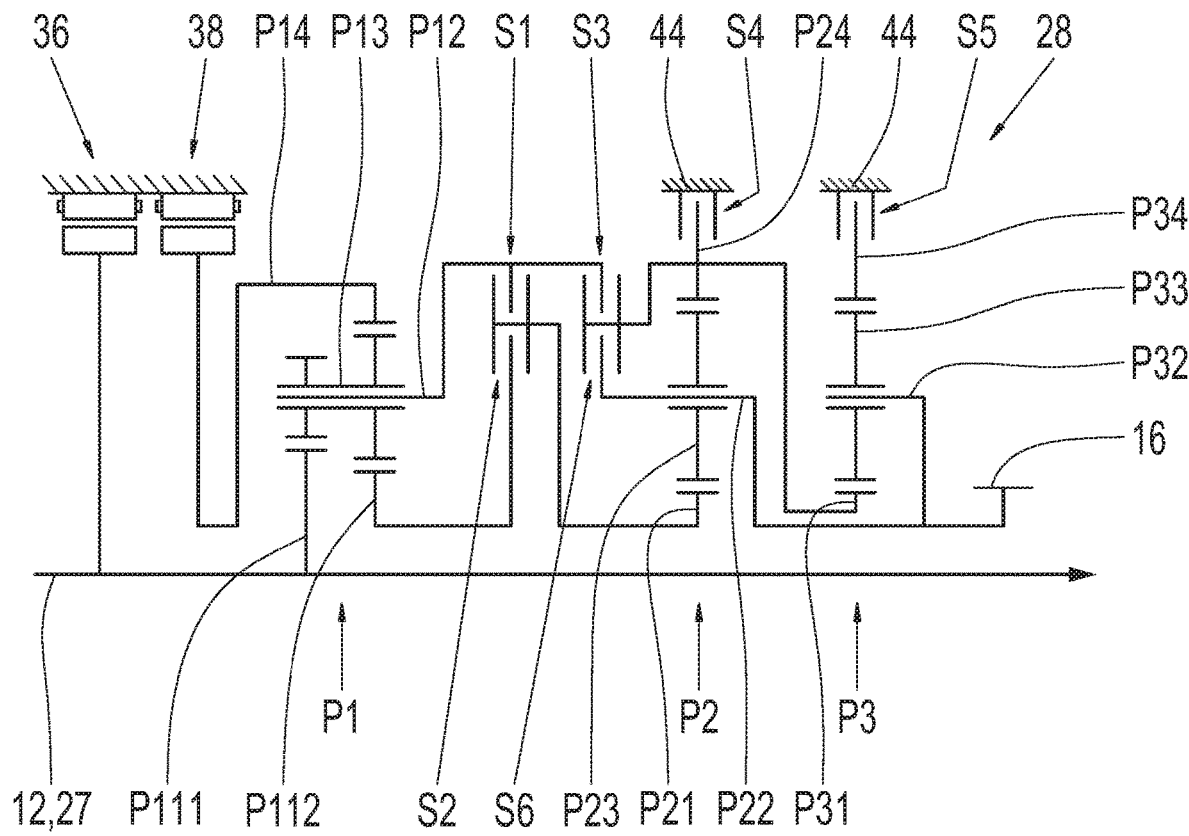

FIG. 5 shows a further alternative embodiment of the power-split transmission 28, which differs from the embodiments according to FIGS. 2 and 3 in that the sixth shifting element S6 optionally couples the secondary planetary carrier P22 rotationally fixed to the secondary ring gear P24. In other respects reference should be made to the descriptions concerning FIG. 2.

As regards the arrangement of the third shifting element S3 and the sixth shifting element S6, the embodiment according to FIG. 5 corresponds to the embodiment shown in FIG. 3.

The power-split transmissions 28 shown in FIGS. 1 to 5 can be operated by means of the method explained below. An associated shifting scheme is shown in FIG. 6.

In this connection, a first forward traveling range FB-V1 is set when the first shifting element S1 and the fourth shifting element S4 are closed and all the other shifting elements are open.

A second forward traveling range FB-V2 is selected when the second shifting element S2 and the fourth shifting element S4 are closed and all the other shifting elements are open.

A third forward traveling range FB-V3 is obtained when the third shifting element S3 and the second shifting element S2 are closed and all the other shifting elements are open.

A fourth forward traveling range FB-V4 is set when the second shifting element S2 and the sixth shifting element S6 are closed and all the other shifting elements are open.

A first reverse traveling range FB-R1 is engaged when the first shifting element S1 and the fifth shifting element S5 are closed and all the other shifting elements are open.

A second reverse traveling range FB-R2 is selected when the second shifting element S2 and the fifth shifting element S5 are closed and all the other shifting elements are open.

Thus, there are four forward traveling ranges and two reverse traveling ranges.

Figure 7:
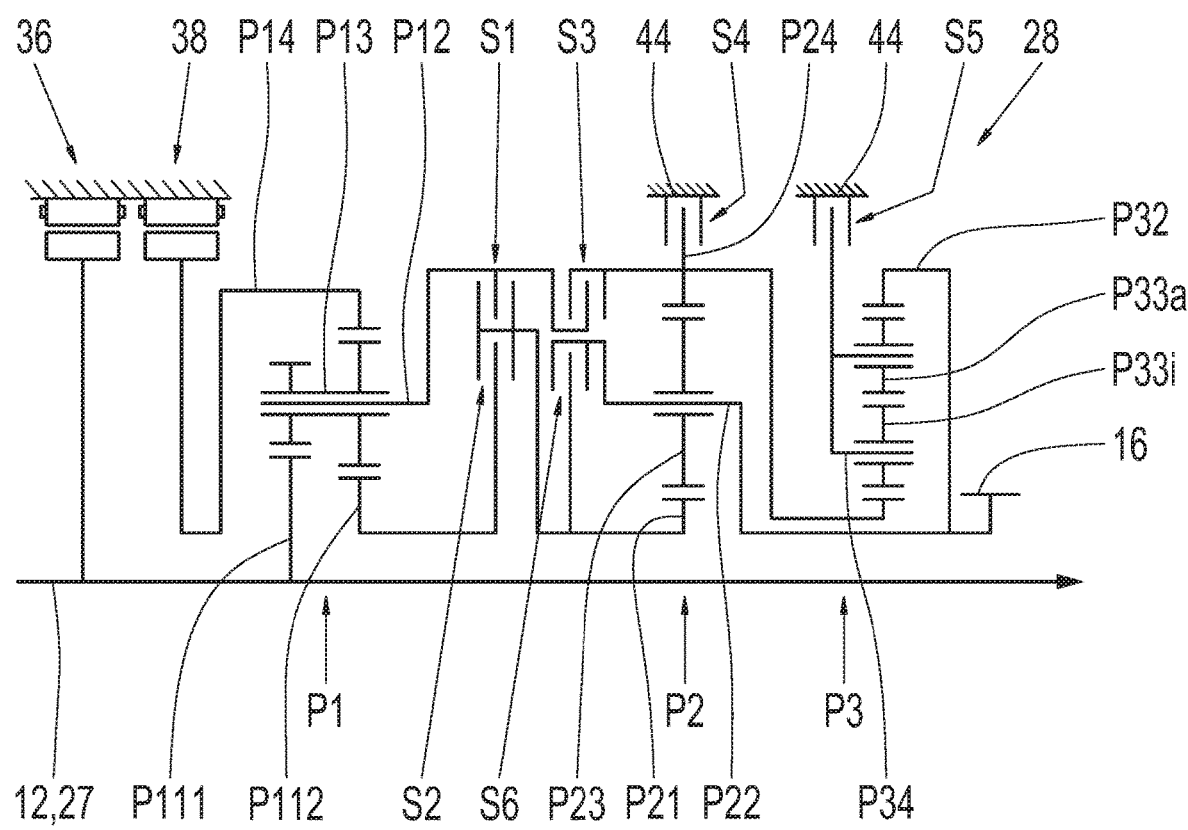

FIG. 7 shows a further alternative of the power-split transmission 28. This differs from the embodiment according to FIG. 2 only in relation to the tertiary planetary gearset P3.

The tertiary planetary gearset P3 is in this case made as a so-termed plus planetary gearset.

This has an inner planetary gearwheel P33i and an outer planetary gearwheel P33a. In such a case it is known that plus planetary gearsets always have two planetary gearwheel groups, whereas minus planetary gearsets only have a single planetary gearwheel group.

The first tertiary planetary gearset element 32 is now a tertiary ring gear.

This is coupled rotationally fixed to the secondary planetary carrier P22 and the output shaft 16.

The second tertiary planetary gearset element P34 is now a tertiary planetary carrier. On this are mounted the two planetary gearwheels P33a and P33i.

Furthermore, the planetary carrier in the form of the second tertiary planetary gearset element P34 can optionally be coupled rotationally fixed to the transmission housing 44 by means of the fifth shifting element S5.

In other respects reference should be made to the descriptions relating to FIG. 2.

The power-split transmission 28 according to FIG. 7 can also be operated in accordance with the method explained with reference to FIG. 6. In other words the shifting scheme shown in FIG. 6 also applies to the power-split transmission in FIG. 7.

Figure 8:
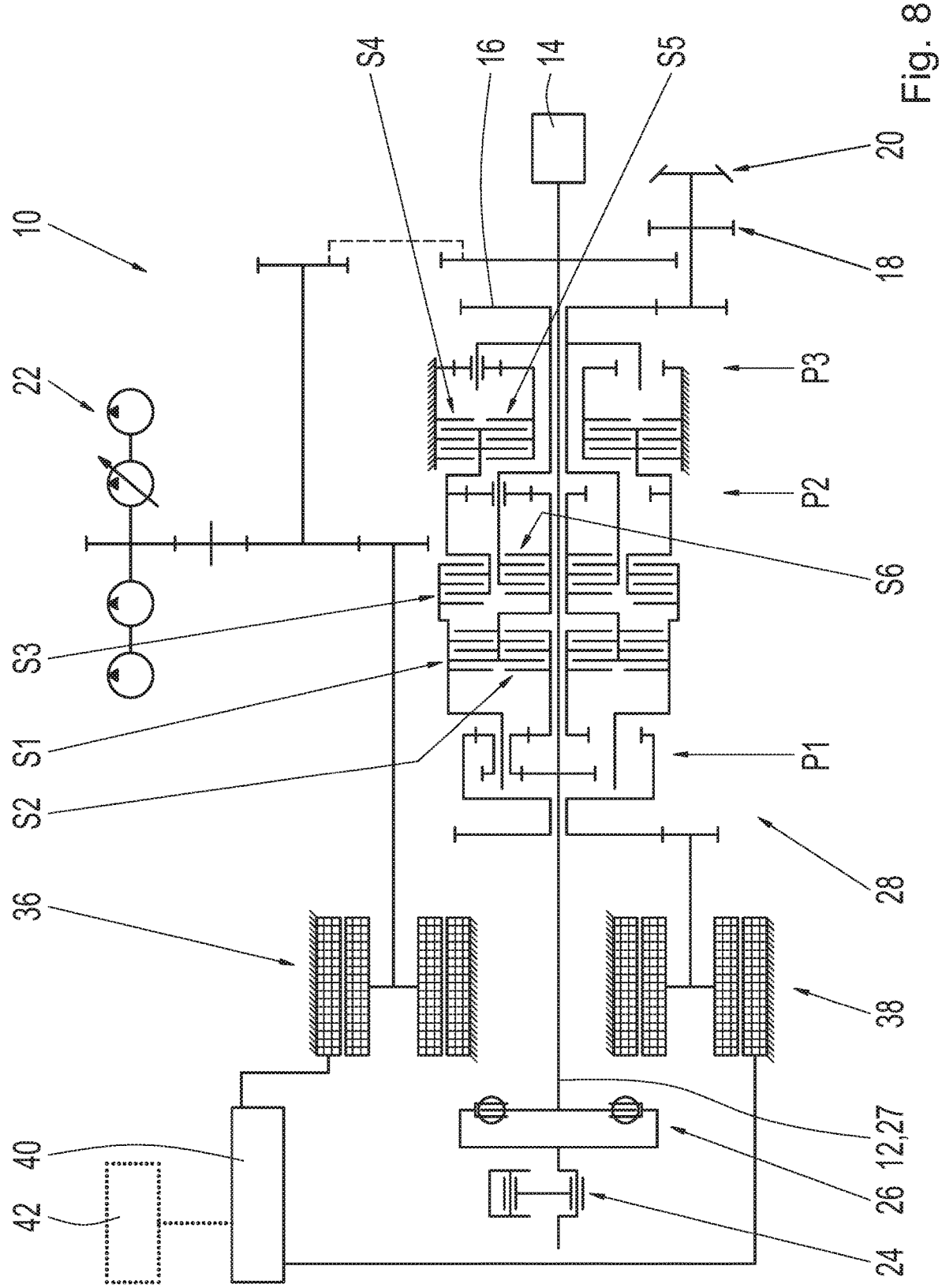
FIG. 8: A drive-train alternative to those in FIGS. 1 to 4, with a power-split transmission according to the invention according to a further variant.

FIG. 8 shows an alternative drive-train 10, which differs from the drive-train 10 according to FIGS. 1 and 4 in that the configuration of the power-split transmission 28 is different.

Namely, in this case the fifth shifting element S5 is a clutch instead of a brake as in the embodiments according to FIGS. 1 and 4.

Furthermore, in this case the first adjustment unit 36 is coupled with the input shaft 12 on a transmission output side instead of on a transmission input side as in FIGS. 1 and 4.

Figure 9:
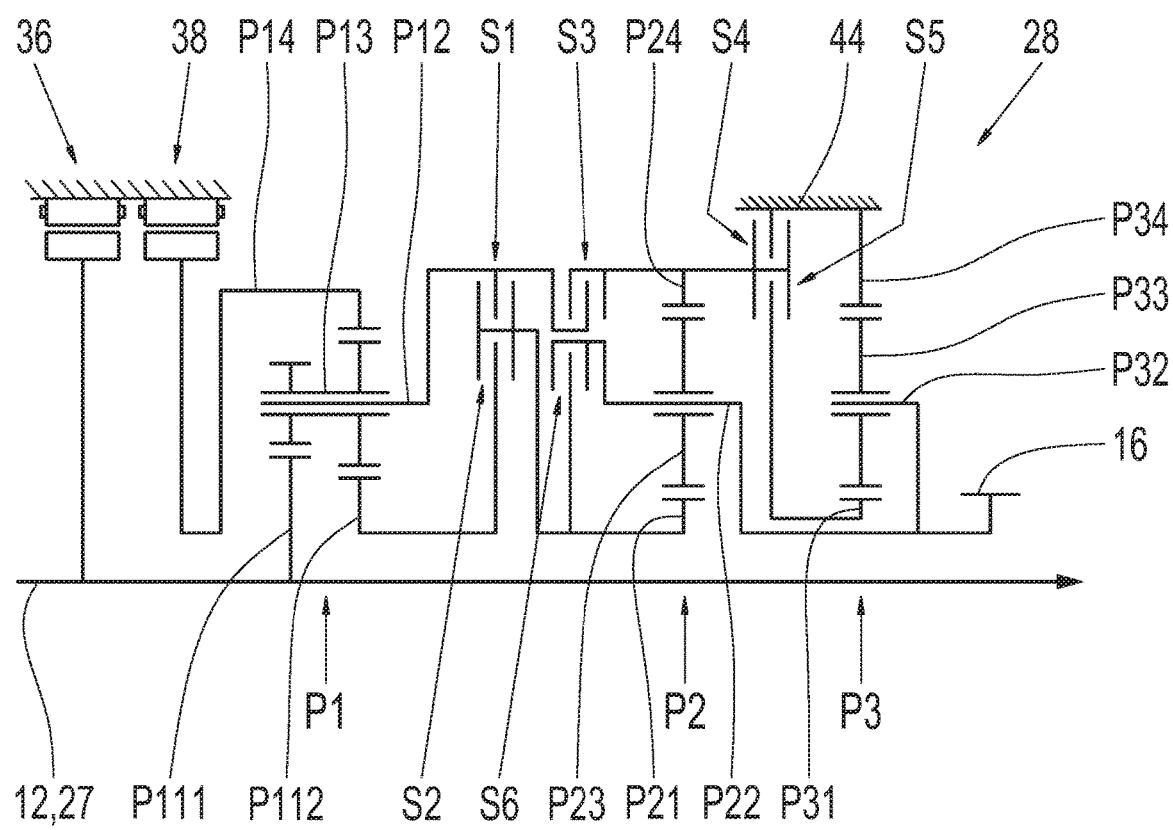
FIG. 9: Detailed view of the power-split transmission in FIG. 8.

The power-split transmission in FIG. 8 is shown in detail in FIG. 9.

It differs from the power-split transmission 28 in FIG. 2 only in respect of the tertiary planetary gearset P3 and the ways its elements are coupled.

The tertiary planetary gearset P3 is again in the form of a minus planetary gearset.

In this case the tertiary sun gear P31 can optionally be coupled rotationally fixed to the secondary ring gear P24 by means of the fifth shifting element S5.

The first tertiary planetary gearset element P32 is again in the form of a tertiary planetary carrier and is connected rotationally fixed to the output shaft 16.

The second tertiary planetary gearset element P34 is a ring gear and is coupled rotationally fixed to the transmission housing 44.

The first shifting element S1 and the second shifting element S2, and also the third shifting element S3 and the sixth shifting element S6 are nested in one another as already described in connection with the embodiment shown in FIG. 2.

In addition, in this case the fourth shifting element S4 and the fifth shifting element S5 are radially nested inside one another, with the fifth shifting element S5 radially inside the fourth shifting element S4.

If the fourth shifting element S4 and the fifth shifting element S5 are in the form of disk brakes or disk clutches, they can use a shared disk carrier.

The power-split transmission 28 according to FIGS. 8 and 9 can be operated by means of the already explained method for operating the power-split transmission. For this, the shifting scheme of FIG. 6 is also applicable.

INDEXES

10 Drive-train
12 Input shaft
14 Power take-off gear system
16 Output shaft
18 Front-wheel drive output
20 Rear-wheel drive output
22 Aggregates and pumps
24 Drive motor
26 Vibration damper
28 Power-split transmission
36 First adjustment unit
38 Second adjustment unit
40 Control unit
42 Storage unit
44 Transmission housing
P1 Primary planetary gearset
P111 First primary sun gear
P112 Second primary sun gear
P12 Shared primary planetary carrier
P13 Shared primary gearwheel
P14 Primary ring gear
P2 Secondary planetary gearset
P21 Secondary sun gear
P22 Secondary planetary carrier
P23 Secondary planetary gearwheel
P24 Secondary ring gear
P3 Tertiary planetary gearset
P31 Tertiary sun gear
P32 First tertiary planetary gearset element
P33 Tertiary planetary gearwheel
P34 Second tertiary planetary gearset element
S1 First shifting element
S2 Second shifting element
S3 Third shifting element
S4 Fourth shifting element
S5 Fifth shifting element
S6 Sixth shifting element

The invention claimed is:

1. A power-split transmission with a first power path and a second power path, wherein the first power path is a mechanical power path, and the power-split transmission comprising:
an input shaft,
an output shaft, a primary planetary gearset with a first primary sun gear, a second primary sun gear, a shared primary planetary carrier and at least one shared primary gearwheel, a secondary planetary gearset with a secondary sun gear, a secondary planetary carrier and at least one secondary ring gear, a tertiary planetary gearset with a first tertiary planetary gearset element, a first shifting element, a second shifting element, a third shifting element, and a fourth shifting element, the first primary sun gear being coupled, in a rotationally fixed manner, to the input shaft, the shared primary planetary carrier being rotationally fixedly connectable to the secondary sun gear, via the first shifting element, the second primary sun gear being rotationally fixedly connectable to the secondary sun gear, via the second shifting element, the shared primary planetary carrier being rotationally fixedly connectable to the secondary ring gear, via the third shifting element, the secondary ring gear being rotationally fixedly connectable to a transmission housing, via the fourth shifting element, the secondary planetary carrier being rotationally fixedly coupled to the first tertiary planetary gearset element, and the output shaft being rotationally fixedly coupled to the first tertiary planetary gearset element.

2. The power-split transmission according to claim 1, further comprising at least one of a fifth shifting element and a sixth shifting element.

3. The power-split transmission according to claim 1, wherein the tertiary planetary gearset is a minus planetary gearset and the first tertiary planetary gearset element is a tertiary planetary carrier and a second tertiary planetary gearset element is a tertiary ring gear.

4. The power-split transmission according to claim 2, wherein either:
a second tertiary planetary gearset element, in a form of a tertiary ring gear, is rotationally fixedly connectable to the transmission housing, via the fifth shifting element, and the secondary ring gear is rotationally fixedly coupled to a tertiary sun gear, or
the tertiary ring gear is rotationally fixedly coupled to the transmission housing and the secondary ring gear is rotationally fixedly connectable to the tertiary sun gear, via the fifth shifting element.

5. The power-split transmission according to claim 1, wherein the tertiary planetary gearset is a plus planetary gearset and the first tertiary planetary gearset element is a tertiary ring gear and a second tertiary planetary gearset element is a tertiary planetary carrier.

6. The power-split transmission according to claim 2, wherein a second tertiary planetary gearset element is a tertiary planetary carrier which is rotationally fixed connectable to the transmission housing via the fifth shifting element, and the secondary ring gear is coupled rotationally fixed to a tertiary sun gear.

7. The power-split transmission according to claim 2, wherein one of:
the secondary sun gear is connectable rotationally fixed to the secondary planetary carrier via the sixth shifting element,
the secondary sun gear is connectable rotationally fixed to the secondary ring gear via the sixth shifting element, and the secondary planetary carrier is rotationally fixedly connectable to the secondary ring gear, via the sixth shifting element.

8. The power-split transmission according to claim 1, wherein the first shifting element and the second shifting element are radially nested with one another.

9. The power-split transmission according to claim 2, wherein the third shifting element and the sixth shifting element are radially nested with one another.

10. The power-split transmission according to claim 2, wherein the fourth shifting element and the fifth shifting element are radially nested with one another.

11. The power-split transmission according to claim 1, wherein at least one of
the fourth shifting element is radially outside the secondary planetary gearset, and
the fifth shifting element is radially outside and the tertiary planetary gearset.

12. The power-split transmission according to claim 1, wherein a first adjustment unit of the second power path is rotationally coupled to the input shaft, and a second adjustment unit of the second power path, which is coupled by way of the second power path to the first adjustment unit, is coupled rotationally fixed to a primary ring gear.

13. The power-split transmission according to claim 12, wherein either:
the second power path is an electrical power path and the first adjustment unit comprises a first electric machine and the second adjustment unit comprises a second electric machine, or
the second power path is a hydraulic power path and the first adjustment unit comprises a first hydrostat and the second adjustment unit comprises a second hydrostat.

14. A method for operating a power-split transmission which has first and second paths, the first power path is a mechanical power path, and the power-split transmission having an input shaft and an output shaft, a primary planetary gearset with a first primary sun gear, a second primary sun gear, a shared primary planetary carrier and at least one shared primary gearwheel, a secondary planetary gearset with a secondary sun gear, a secondary planetary carrier and at least one secondary ring gear, a tertiary planetary gearset with a first tertiary planetary gearset element, first, second, third and fourth shifting elements, the first primary sun gear is coupled, in a rotationally fixed manner, to the input shaft, the shared primary planetary carrier is rotationally fixedly connectable to the secondary sun gear, via the first shifting element, the second primary sun gear is rotationally fixedly connectable to the secondary sun gear, via the second shifting element, the shared primary planetary carrier is rotationally fixedly connectable to the secondary ring gear, via the third shifting element, the secondary ring gear is rotationally fixedly connectable to a transmission housing, via the fourth shifting element, the secondary planetary carrier is rotationally fixedly coupled to the first tertiary planetary gearset element, and the output shaft is rotationally fixedly coupled to the first tertiary planetary gearset element, the method comprising:
implementing a first forward traveling range by engagement of the first shifting element and the fourth shifting element and disengagement of all the other shifting elements,
implementing a second forward traveling range by engagement of the second shifting element and the fourth shifting element and disengagement of all the other shifting elements, implementing a third forward traveling range by engagement of the third shifting element and the second shifting element and disengagement of all the other shifting elements, implementing a fourth forward traveling range by engagement of the second shifting element and a sixth shifting element and disengagement of all the other shifting elements, implementing a first reverse traveling range by engagement of the first shifting element and a fifth shifting element and disengagement of all the other shifting elements, and implementing a second reverse traveling range by engagement of the second shifting element and the fifth shifting element and disengagement of all the other shifting elements.

15. A drive-train of a working machine having a power-split transmission power-split transmission with a first power path and a second power path, wherein the first power path is a mechanical power path, and the power-split transmission comprising:

an input shaft, an output shaft, a primary planetary gearset with a first primary sun gear, a second primary sun gear, a shared primary planetary carrier, and at least one shared primary gearwheel, a secondary planetary gearset with a secondary sun gear, a secondary planetary carrier, and at least one secondary ring gear, a tertiary planetary gearset with a first tertiary planetary gearset element, a first shifting element, a second shifting element, a third shifting element, and a fourth shifting element, the first primary sun gear being coupled, in a rotationally fixed manner, to the input shaft, the shared primary planetary carrier being rotationally fixedly connectable to the secondary sun gear, via the first shifting element , the second primary sun gear being rotationally fixedly connectable to the secondary sun gear, via the second shifting element, the shared primary planetary carrier being rotationally fixedly connectable to the secondary ring gear, via the third shifting element, the secondary ring gear being rotationally fixedly connectable to a transmission housing, via the fourth shifting element, the secondary planetary carrier being rotationally fixedly coupled to the first tertiary planetary gearset element, and the output shaft being rotationally fixedly coupled to the first tertiary planetary gearset element.

* * * * *